(12) United States Patent
Xie et al.

(10) Patent No.: US 12,488,828 B2
(45) Date of Patent: Dec. 2, 2025

(54) EFFICIENT PERIODIC BACKEND REFRESH READS FOR REDUCING BIT ERROR RATE IN MEMORY DEVICES

(71) Applicant: Micron Technology, Inc., Boise, ID (US)

(72) Inventors: Tingjun Xie, Milpitas, CA (US); Yang Liu, San Jose, CA (US); Juane Li, Milpitas, CA (US); Aaron Lee, Sunnyvale, CA (US); Jiangli Zhu, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 181 days.

(21) Appl. No.: 18/227,139

(22) Filed: Jul. 27, 2023

(65) Prior Publication Data
US 2024/0071462 A1 Feb. 29, 2024

Related U.S. Application Data

(60) Provisional application No. 63/402,411, filed on Aug. 30, 2022.

(51) Int. Cl.
*G11C 11/406* (2006.01)
*G11C 11/4096* (2006.01)

(52) U.S. Cl.
CPC .. *G11C 11/40626* (2013.01); *G11C 11/40615* (2013.01); *G11C 11/4096* (2013.01)

(58) Field of Classification Search
CPC ........ G11C 11/40626; G11C 11/40615; G11C 11/4096; G11C 11/5642; G11C 16/26; G11C 16/3418; G06F 3/0655; G06F 3/0604; G06F 3/0638; G06F 3/0683
See application file for complete search history.

(56) References Cited

U.S. PATENT DOCUMENTS

2022/0351798 A1* 11/2022 Her ................... G11C 29/12005
2023/0063584 A1* 3/2023 Uchida ................. G06F 3/0443

FOREIGN PATENT DOCUMENTS

CN 114994262 A * 9/2022

* cited by examiner

*Primary Examiner* — Sultana Begum
(74) *Attorney, Agent, or Firm* — Lowenstein Sandler LLP (57) ABSTRACT

A processing device in a memory sub-system traverses a plurality of management units of a memory device at a defined scan/read refresh frequency. For every management unit of the plurality of management units, the processing device identifies a page satisfying a lowest sensing overhead criterion, and senses data of the identified page without transferring the data out of the memory device. A non-transitory computer readable medium includes program instructions that when executed by a processing device, cause the processing device to perform operations of traversing a plurality of management units of a memory device at a defined scan/read refresh frequency. For every management unit, the processing device identifies a page satisfying a lowest sensing overhead criterion, and senses data of the identified page without transferring the data out of the memory device.

20 Claims, 7 Drawing Sheets

EFFICIENT PERIODIC BACKEND REFRESH READS FOR REDUCING BIT ERROR RATE IN MEMORY DEVICES

CROSS REFERENCE TO RELATED APPLICATIONS

This application claims priority to U.S. Provisional patent application No. 63/402,411 titled "EFFICIENT PERIODIC BACKEND REFRESH READS FOR REDUCING BIT ERROR RATE IN MEMORY DEVICES," filed on Aug. 30, 2022, the entire contents of which is incorporated herein by reference.

TECHNICAL FIELD

Embodiments of the disclosure relate generally to memory sub-systems, and more specifically, relate to systems and methods for reducing first read raw bit error rate and trigger rate in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to systems and methods for performing a periodic read operation to reduce first read raw bit error rate in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device that is a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1. Each of the memory device can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single-level cell (SLC) can store one bit of information and has two logic states. Similarly, a multi-level cell (MLC) can store two bits per cell, a triple-level cell (TLC) can store three bits per cell, a quad-level cell (QLC) can store four bits per cell, and a penta-level cell (PLC) can store five bits per cell. The memory sub-system includes a memory sub-system controller that can communicate with the memory devices to perform operations such as reading data, writing data, or erasing data at the memory devices and other such operations. A memory sub-system controller is described in greater below in conjunction with FIG. 1.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. The metadata and host data, together, is hereinafter referred to as "payload." Metadata, host data, and parity data, which is used for error correction, can collectively form an error correction code (ECC) codeword (CW). Metadata can also include data version (e.g. used to distinguish age of data written), valid bitmap (which LBAs or logical transfer units contain valid data), etc.

When performing memory access operations, such as read operations (e.g., in response to a received memory access request/command), a memory sub-system can correct the errors present in the data being read. For example, upon reading data from a memory device, the memory sub-system controller can perform an error detection and correction operation. The error detection and correction operation includes identifying one or more errors (e.g., bit flip errors) in the read data. The memory sub-system can have the ability to correct a certain number of errors per management unit (e.g., using an error correction code (ECC)). As long as the number of errors in the management unit is within the ECC capability of the memory sub-system, the errors can be corrected before the data is provided to the requestor (e.g., the host system). The fraction of bits that contain incorrect data before applying ECC is called the raw bit error rate (RBER). The fraction of bits that contain incorrect data after applying ECC is called the uncorrectable bit error rate (LIBER). In an attempt to prevent those same errors from being present when a subsequent memory access operation is performed on the same management unit (e.g., a block or a page or a superblock), the memory sub-system can perform a writeback operation. "Superblock" refers to a set of physical blocks that include a physical block from each plane within a corresponding group. In one or more embodiments, a superblock can span across multiple memory devices. In a writeback operation, the data from the management unit is overwritten with the corrected data that was just read from the memory device. Thus, any errors that were present in the data when it was read will be corrected so that those errors are not present going forward. However, certain memory sub-systems lack any feedback mechanism to ensure that no errors are introduced to the data during the writeback operation. Furthermore, there is no way to determine the physical location on the storage media where the management unit is degraded.

Negative-and (NAND) blocks include a set of pages which are organized into page stacks which are written together. The pages can be numbered from 0 to N−1 with certain groups of pages paired together for programming, and the pages can be programmed in a particular order in order to guarantee data integrity. For example, if pages 0 and 1 form a page stack together, followed by pages 2 and 3, 4 and 5, and 6 and 7, each of these page stacks would be programmed in an increasing order. Some programming schemes may require multiple passes where a page stack is programmed on an initial pass and is left in an intermediary state, and later programmed again until the page stack is fully programmed to its final state. A programming operation of a NAND page stack may result in either a program pass or program failure status. However, a passing status from a programming operation does not necessarily guarantee data integrity and the programming operation may have actually resulted in what is referred to as a "silent program failure" where data integrity is compromised even though a passing programming status was received. Higher, system level mechanisms are required to protect against these silent program failures and to avoid exposing too many data loss events to the host system, which is reading data from the memory device including the NAND blocks. For better performance, a certain uncorrectable bit error rate (UBER) is required such that only some number of bits of data are uncorrectable by the memory sub-system out of X bits read. For example, an UBER of 1e-Y requires that only 1 bit out of $1*10^Y$ bits read was not error corrected by the memory sub-system. Therefore, a lower UBER results in better performance of the memory sub-system.

According to the number of bits stored in each cell, each wordline can be connected to memory cells contained by one or more pages (e.g., SLC: 1, MLC: 2, TLC: 3, QLC: 4). The NAND read operations are based on pages, and each page includes one or more codewords (CWs). The codewords are a basic unit of ECC encoding or decoding. The data quality in the NAND cells can degrade due to several mechanisms (e.g. data retention (DR), read disturb (RD), latent read disturb (LRD), etc.), which cause high raw bit error rate (RBER), high trigger rate (TR), and eventually result in reliability (REL) issues.

Each block in a memory sub-system can be in a stable (S) state or a transient (T) state, depending on the operational history on the block. A block in the T-state has a lower read RBER when compared to a block in the S-state. A block is in T-state just after a program operation or a short time after a read operation (i.e., within a predefined time window following a memory access operation performed on the block, where the duration of time window is defined by the type of the memory access operation). The read operation can be any media sensing operation performed on any page of the block. A block in the S-state can exhibit high RBER. A block transitions into S-state when the T-state block is left idle for at least a threshold period of time (minutes to a few hours, depending on temperature), or other blocks on the same plane are erased at least a threshold number of times. Generally, the time taken by a memory cell to transition from S-state to a T-state is significantly higher at lower temperatures (e.g. 25 degrees C.) and lower at higher temperatures (e.g., 70 degrees C.). Similarly, the time taken by a memory cell to transition from T-state to S-state is significantly higher at lower temperatures (e.g. 25 degrees C.) and lower at higher temperatures (e.g., 70 degrees C.). However, for the same temperature of the memory die, transition of the memory cell from S-state to T-state is significantly faster when compared to transition of the memory cell from T-state to S-state. After a read operation is performed on a block with S-state, the block transitions to a T-state in a few milliseconds or a few tens of milliseconds. An S-state block with high RBER is, however, a threat to TR and performance and may cause QoS issues. Therefore, efforts can be made to maintain all the blocks on the memory sub-system in a T-state. A read operation performed by a host can serve as S-state to T-state trigger; however, the availability of a host to perform a read operation depends on the host traffic pattern. Consequently, "first read" issues are more common in larger capacity drives because the host's read operation can only reach a small portion of blocks on the drive during the S-state to T-state transition. A "first read" is a read operation that causes a memory cell (e.g. a block) to transition from an S-state to T-state.

Besides serving host read and write requests, a memory sub-system can periodically read and check (and determine the condition of) each block in the backend, and perform a media management operation, e.g., by folding the block if any codeword demonstrates a high trigger rate or reliability risk. The folding operation may involve relocating the data stored at the affected block of the memory device to another block. A "full scan instance" is performed when every wordline or page of every block of the memory device has been scanned within the time period specified by the system requirements. However, a full scan instance can take a long time to complete; sometimes a few tens of days or up to a few months. Therefore, a full scan instance can be divided into a number of smaller 'scan instances' where each scan instance scans only a portion of the WLs or pages while still scanning all the blocks on the drive. Such a scan instance can still take a few days to complete.

For each scan instance, the scan is performed using a nested loop where block index is the outer loop, and the page index is the inner loop. Thus, the blocks are scanned one by one, and inside each block a number of ordinary and mandatory WLs are scanned. Accordingly, a large portion of blocks can return to S-state if the drive remains idle, because it can take several days for the media scan to scan the same block again.

Aspects of the present disclosure address the above issues by performing a dedicated periodic read operation, in addition to conventional media scan, on every block of the memory die, thereby maintaining the blocks in a T-state with low RBER and trigger rate. In some embodiments, the memory sub-system controller performs a media scan operation where for each scan instance, the scan is performed using a nested loop where the page index is the outer loop and the block index is the inner loop. By doing so, for a certain block, it is more frequently (in minutes) read by media scan, since the block index is in the inner loop and the inner loop takes a shorter time to finish. Therefore, the disclosed method poses much less a risk of first read issue. Additionally, because performing a read operation on a lower page of a SLC page stack or a lower page of a MLC page stack takes much lesser time when compared to performing a read operation on a page of a QLC page stack (e.g., 90 μs), the memory sub-system controller identifies a page that satisfies a lowest sensing overhead criterion (e.g., the page that takes the least amount of time to perform a read operation to turn the block into T-state) and performs a read operation with respect to the identified page without transferring the data out of the memory device. Since there is no data transferred out of the memory device, there is no need for the controller to clock out sensed NAND data through the interface (e.g. an open NAND flash interface (ONFI) bus) that connects the memory dies to the host. In some embodiments, the memory sub-system controller may perform the read operation with respect to a lower page (LP) of the MLC page stack. In some embodiments, the memory sub-system controller may perform the read operation with respect to a lower page (LP) of the SLC page stack.

The read operation performed on a wordline of a block refreshes the entire block thus maintaining the block in the T-state with low RBER and trigger rate. Upon completing the read operation in a block, the memory sub-system controller then performs a read operation in a similar fashion with respect to the next block of the memory die, and continues to perform the read operation in a block-by-block manner until all blocks on the memory die have been refreshed. These read refresh operations are repeated as long as the memory device is running.

Advantages of this approach include reducing the first read high RBER issues on the memory sub-system, especially for large capacity drives. The systems and methods disclosed also improve runtime performance and QoS of memory sub-systems. The systems and methods disclosed and introduce no additional writes on the NAND side. Additionally, there is little to no increased backend traffic bandwidth consumption. The systems and methods disclosed result in finer temporal scanning granularity for each block to better identify potential trigger rate or reliability risks than some other media scan methodologies. The systems and methods disclosed very flexibly adjust the scanning scheduling details and maximize scan effectiveness to guarantee the media data quality. The systems and methods disclosed also limit the block read interval to be no more than a few minutes. The latent read disturb (LRD) concern is minimal since a block can undergo with at most of a few hundred LRD reads for a duration of 2-3 days, it brings negligible impact to NAND data integrity since the media can generally tolerate a few hundred thousand of LRD reads or even more.

Figure 1:
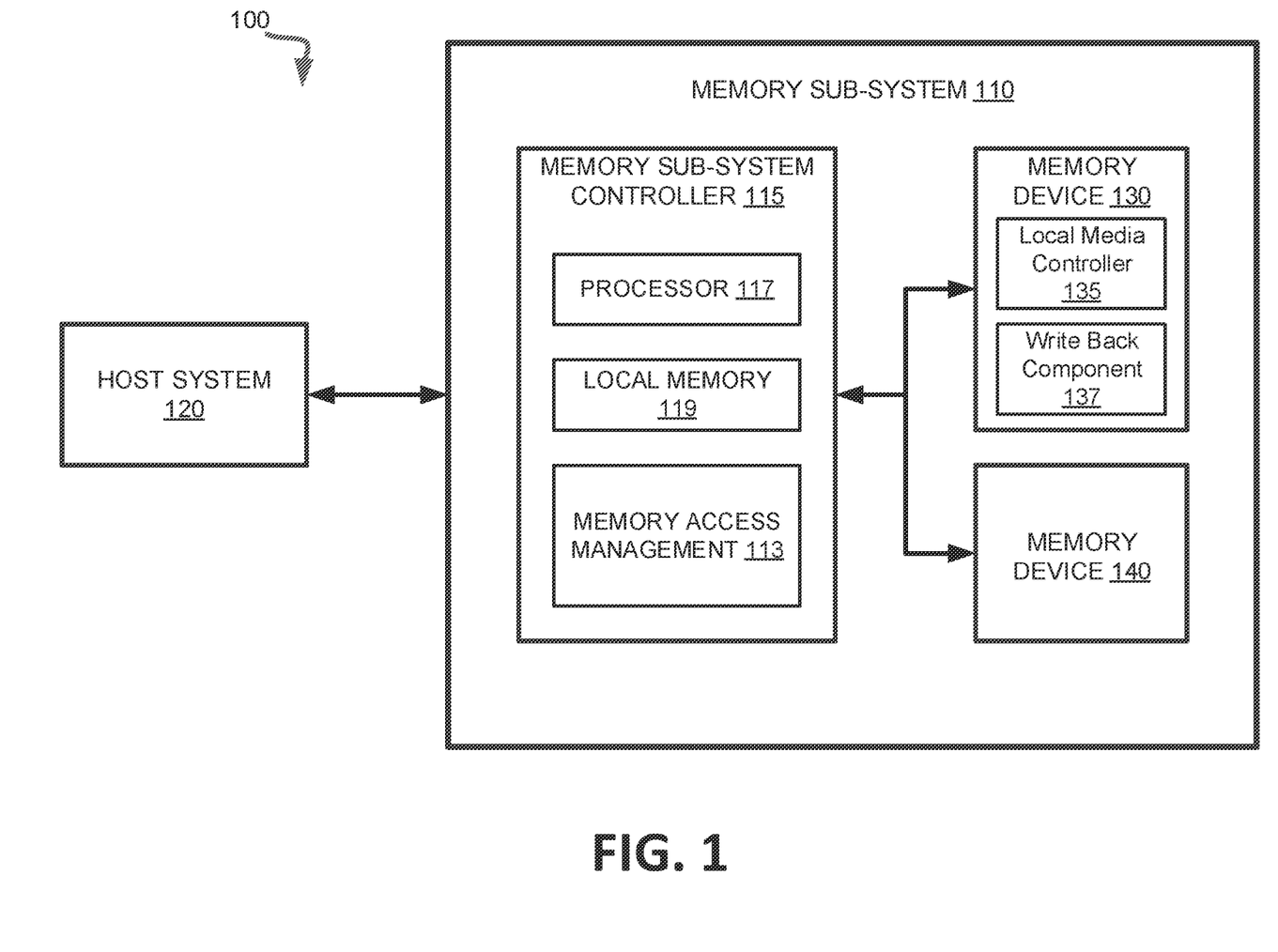
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a Zoned Namespace (ZNS) SSD, a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLC) can store one bit per cell. Other types of memory cells, such as multi-level cells (MLCs), triple-level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g, logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device. Each of the memory devices 130 may include a writeback component 137, which may perform one or more writeback operations in an attempt to prevent errors from being present when a subsequent memory access operation is performed on the same management unit (e.g., a block or a page or a superblock). In a writeback operation, the data from the management unit is overwritten with the corrected data that was just read from the memory device. Thus, any errors that were present in the data when it was read will be corrected so that those errors are not present going forward.

In one embodiment, the memory sub-system 110 includes a memory access management component 113 that performs a periodic media scan operation (e.g., a read refresh operation) on every block of the memory die, thereby maintaining the blocks in a T-state with low RBER and trigger rate. In some embodiments, the memory access management component 113 traverses the blocks at a defined scan (read refresh) frequency, which may be determined based on a current temperature of the memory die. For every block of the memory die, the memory access management component 113 may identify a page that satisfies a lowest sensing overhead criterion (e.g., one that takes the least amount of time to perform a media scan/read refresh operation) and perform a media sensing operation with respect to the identified page. The media sensing operation (e.g. read operation) may be performed without transferring the data out of the memory device. Since there is no data transferred out of the memory device, there is no need for the memory access management component 113 to clock out sensed NAND data through the interface (e.g. an open NAND flash interface (ONFI) bus) that connects the memory dies to the host. In some embodiments, the memory access management component 113 may perform the read operation with respect to the lower page (LP) of the MLC page stack. In some embodiments, the memory sub-system controller may perform the read operation with respect to a lower page (LP) of a SLC page stack. The read operation performed on a wordline of a block refreshes the entire block thus maintaining the block in the T-state with low RBER and trigger rate. Upon completing the read operation in a block, the processor 117 in conjunction with the memory access management 113 then moves onto the next block and performs a read operation in a similar fashion, and continues to perform the read operation in a block-by-block manner until all the states of the blocks on the memory die have been refreshed. These read refresh operations are repeated as long as the memory device is running.

In some embodiments, the memory sub-system controller 115 includes at least a portion of memory access management 113. For example, the memory sub-system controller 115 can include a processor 117 (e.g., a processing device) configured to execute instructions stored in local memory 119 for performing the operations described herein. In other embodiments, memory access management 113 is part of memory sub-system 110, but is separate from memory sub-system controller 115. In other embodiments, local media controller 135 includes at least a portion of memory access management 113 and is configured to perform the functionality described herein.

Figure 2A:
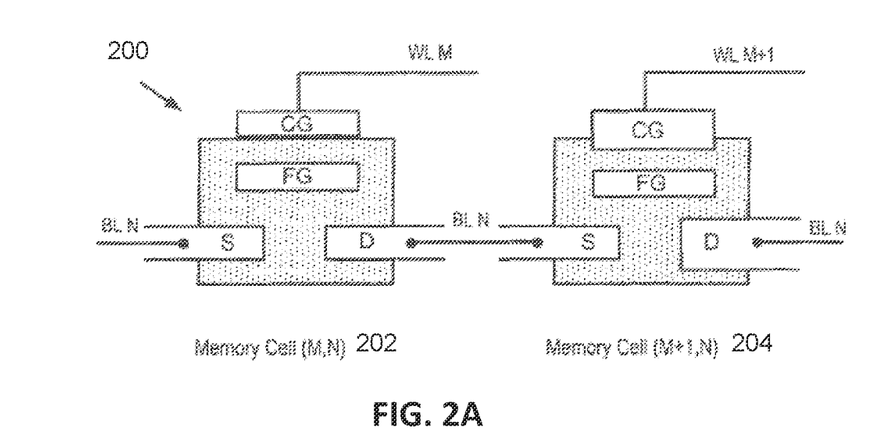
FIG. 2A illustrates schematically floating gate transistor-based memory cells as arranged in a memory device, in accordance with some embodiments of the present disclosure.
Figure 2B:
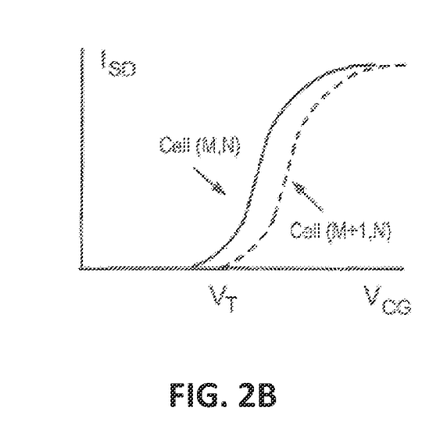
FIG. 2B illustrates schematically dependence of the source-drain current on the control gate voltage for two non-identical memory cells having different threshold control gate voltages, in accordance with some embodiments of the present disclosure.

As illustrated schematically in FIG. 2A, a memory cell of a memory device can be a transistor, such as metal-oxide-semiconductor field effect transistor (MOSFET), having a source (S) electrode and a drain (D) electrode to pass electric current there through. The source and drain electrodes can be connected to a bitline (BL). Multiple memory cells can share a bitline, as in NAND memory devices, in one implementation. For example, two memory cells 202 and 204 illustrated in FIG. 2A can be connected to the same bitline N and two different wordlines, M and M+1, respectively. Alternatively, e.g., in NOR memory devices, each memory cell can have a dedicated bitline that is not shared with other memory cells. A memory cell can further have a control gate (CG) electrode to receive a voltage signal $V_{CG}$ to control the magnitude of electric current flowing between the source electrode and the drain electrode. More specifically, there can be a threshold control gate voltage $V_T$ (herein also referred to as "threshold voltage" or simply as "threshold") such that for $V_{CG}<V_T$, the source-drain electric current can be low, but can increase substantially once the control gate voltage has exceeded the threshold voltage, $V_{CG}>V_T$. Because the actual geometry of gates and electrodes of a memory cell (as well as the environment of the memory cell) can vary from cell to cell, the threshold voltages $V_T$ can be different even for transistors implemented on the same die. For example, as illustrated in FIG. 2A, memory cell 204 can include gates and electrodes having different sizes. As a result, transistors of the same memory device can be characterized by a distribution of their threshold voltages, $P(V_T)=dW/dV_T$, so that $dW=P(V_T)dV_T$ represents the probability that any given transistor has its threshold voltage within the interval $[V_T,V_T+dV_T]$. For example, FIG. 2B illustrates schematically dependence of the source-drain current $I_{SD}$ on the control gate voltage for two non-identical memory cells, e.g. memory cell 202 (solid line) and memory cell 204 (dashed line), having different threshold control gate voltages, in one exemplary implementation.

To make a memory cell non-volatile, the cell can be further equipped with a conducting island—a floating gate (FG)—that can be electrically isolated from the control gate, the source electrode, and the drain electrode by insulating layers (depicted in FIG. 2A as the dotted region). In response to an appropriately chosen positive (in relation to the source potential) control gate voltage $V_{CG}$, the floating gate can receive (via Fowler-Nordheim tunneling or hot electron injection) a negative electric charge Q, which can be permanently stored thereon even after the power to the memory cell—and, consequently, the source-drain current—is ceased. The charge Q can affect the distribution of threshold voltages $P(V_T,Q)$. Generally, the presence of the negative charge Q shifts the distribution of threshold voltages towards higher voltages, compared with the distribution $P(V_T)$ for an uncharged floating gate. This happens because a stronger positive control gate voltage $V_{CG}$ can be needed to overcome a negative potential of the floating gate charge Q. If any charge of a sequence $Q_k$ of charges with $1 \le k \le 2^N$ can be selectively programmed (and later detected during a read operation) into a memory cell, the memory cell can function as an N-bit storage unit. The charges $Q_k$ are preferably selected to be sufficiently different from each other, so that any two adjacent voltage distributions $P(V_T, Q_k)$ and $P(V_T, Q_{k+1})$ do not overlap being separated by a valley margin, so that $2^N$ distributions $P(V_T, Q_k)$ are interspaced with $2^N-1$ valley margins.

Figure 2C:
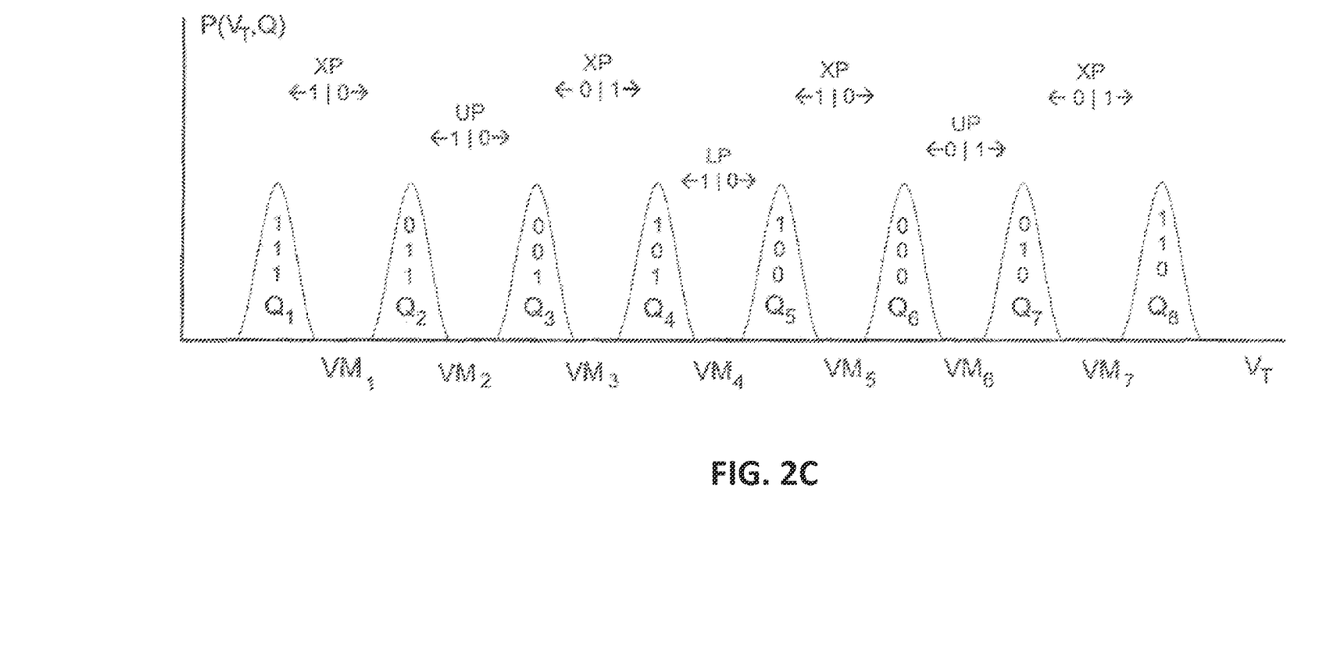
FIG. 2C illustrates schematically a distribution of threshold control gate voltages for a flash memory cell capable of storing three bits of data by programming the memory cell into at least eight charge states that differ by the amount of charge on the cell's floating gate, in accordance with some embodiments of the present disclosure.

FIG. 2C illustrates schematically a distribution of threshold control gate voltages for a memory cell capable of storing three bits of data by programming the memory cell into at least eight charge states that differ by the amount of charge on the cell's floating gate. FIG. 2C shows distributions of threshold voltages $P(V_T, Q_k)$ for $2^N=8$ different charge states of a tri-level cell (TLC) separated with $2^3-1=7$ valley margins $VM_k$. Accordingly, a memory cell programmed into a charge state k-th (i.e., having the charge $Q_k$ deposited on its floating gate) can be storing a particular combination of N bits (e.g., 0110, for N=4). This charge state $Q_k$ can be determined during a readout operation by detecting that a control gate voltage $V_{CG}$ within the valley margin $VM_k$ is sufficient to open the cell to the source-drain current whereas a control gate voltage within the preceding valley margin $VM_{k-1}$ is not.

In general, storage devices with NAND memory are classified by the number of bits stored by each cell of the memory. For example, a single-level cell (SLC) memory has cells that can each store one bit of data (N=1). A multi-level cell (MLC) memory has cells that can each store up to two bits of data (N=2), a tri-level cell (TLC) memory has cells that can each store up to three bits of data (N=3), and a quad-level cell (QLC) memory has cells that can each store up to four bits of data (N=4). In some storage devices, each wordline of the memory can have the same type of cells within a given partition of the memory device. That is, all wordlines of a block or a plane are SLC memory, or all wordlines are MLC memory, or all wordlines are TLC memory, or all wordlines are QLC memory. Because an entire wordline is biased with the same control gate voltage $V_{CG}$ during write or read operations, a wordline in SLC memory typically hosts one memory page (e.g., a 16 KB or a 32 KB page) that is programmed in one setting (by selecting various bitlines consecutively). A wordline of a higher-level (MLC, TLC, or QLC) memory cell can host multiple pages on the same wordline. Different pages can be programmed (by the memory controller 115 via electronic circuitry) in multiple settings. For example after a first bit is programmed on each memory cell of a wordline, adjacent wordlines can first be programmed before a second bit is programmed on the original wordline. This can reduce electrostatic interference between neighboring cells. As explained above, the memory controller 115 can program a state of the memory cell and then read can read this state by comparing a read threshold voltage $V_T$ of the memory cell against one or more read level thresholds. The operations described herein can be applied to any N-bit memory cells.

For example, a TLC can be capable of being in one of at least eight charging states $Q_k$ (where the first state can be an uncharged state $Q_1=0$) whose threshold voltage distributions are separated by valley margins $VM_k$ that can be used to read out the data stored in the memory cells. For example, if it is determined during a read operation that a read threshold voltage falls within a particular valley margin of $2^N-1$ valley margins, it can then be determined that the memory cell is in a particular charge state out of $2^N$ possible charge states. By identifying the right valley margin of the cell, it can be determined what values all of its N bits have. The identifiers of valley margins (such as their coordinates, e.g., location of centers and widths) can be stored in a read level threshold register of the memory controller 115.

The read operation can be performed after a memory cell is placed in one of its charged states $Q_k$ by a previous write operation. For example, to program (write) 96 KB (48 KB) of data onto cells belonging to a given wordline M of a TLC, a first programming pass can be performed. The first programming pass can store 32 KB (16 KB) of data on the wordline M by placing appropriate charges on the floating gates of memory cells of the workline M. For example, a charge Q can be placed on the floating gate of a specific cell. A cell is programmed to store value in its lower-page (LP) bit if the cell is driven to any of the charge states $Q_1, Q_2, Q_3$, or $Q_4$. The cell is programmed to store value 0 in its LP bit if the cell is driven to any of the charge states $Q_5, Q_6, Q_7$, or $Q_8$. As a result, during a read operation it can be determined that the applied control gate voltage $V_{CG}$ placed within the fourth valley margin $VM_4$ is sufficient to open the cell to the source-drain electric current. Hence, it can be concluded that the cell's LP bit is in state 1 (being in one of the charge states $Q_k$ with k≤4). Conversely, during the read operation it can be determined that the applied control gate voltage $V_{CG}$ within the fourth valley margin is insufficient to open the cell to the source-drain electric current. Hence, it can be concluded that the cell's LP bit is in state 0 (being in one of the charge states $Q_k$ with k>4).

After cells belonging to the M-th wordline have been programmed as described, the LP has been stored on the M-th wordline and the programming operation can proceed with additional programming passes to store an upper page (UP) and an extra page (XP) on the same wordline. Although such passes can be performed immediately after the first pass is complete (or even all pages can be programmed in one setting), in order to minimize errors it can be advantageous to first program LPs of adjacent wordlines (e.g., wordlines M+1, M+2, etc.) prior to programming UP and XP into wordline M. Indeed, due to electrostatic interaction between electric charges, charges that are placed on a given wordline can modify threshold voltages of memory cells belonging to adjacent wordlines (as well as thresholds of memory cells within the same wordline). Therefore, it can be disadvantageous to have significantly different charges on neighboring memory cells. Accordingly, it can be beneficial—from the perspective of minimizing occurrences of erroneously programmed bits—to program adjacent wordlines incrementally. For example, programming of a LP on wordline M can be followed with programming of a LP into wordline M+1, followed with programming an LP into wordline M+2, followed with programing an UP into wordline M, and so on, with virtually unlimited number of possible sequences of programming various pages on various wordlines.

When the UP is to be programmed into wordline M, a charge state of a memory cell can be adjusted so that its distribution of threshold voltages is further confined within a known valley margins VM. For example, a cell that is in one of the charge states $Q_1, Q_2, Q_3$, or $Q_4$ (accorded bit 1 status for LP programming) can be driven to just one of two states $Q_1$ or $Q_2$, in which case the cell is to store value 1 in its UP bit. Conversely, a cell can be driven to one of two states $Q_3$ or $Q_4$ to store value 0 in its UP bit. As a result, during a read operation it can be determined that the applied control gate voltage $V_{CG}$ within the second valley margin $VM_2$ is sufficient to open the cell to the source-drain electric current. Hence, it can be concluded that the cell's UP bit is in state 1 (being in one of the charge states $Q_k$ with k≤2). Conversely, during a read operation it can be determined that the applied control gate voltage $V_{CG}$ within the second valley margin $VM_2$ is insufficient to open the cell to the source-drain electric current. Hence, it can be concluded that the cell's UP bit is in state 0 (being in one of the charge states $Q_k$ with 2<k≤4). Likewise, charge states $Q_5, Q_6, Q_7$, or $Q_8$ (accorded bit 0 status for LP programming) can be further driven to the states $Q_5$ or $Q_6$ (UP bit value 0) or the states $Q_7$ or $Q_8$ (UP bit value 1).

Similarly, the extra page (XP) can be programmed into the wordline M by further adjusting the charge state of each its memory cell. For example, a cell that is in the logic state 10 (i.e., UP bit stores value 1 and LP bit stores value 0) and is in one of the charge states $Q_7$ or $Q_8$ can be driven to state $Q_7$ to store value 0 in its XP bit (logic state 010). Alternatively, the cell can be driven to charge state $Q_8$ to store value 1 in its XP bit (logic state 110). As a result, during a read operation it can be determined that the applied control gate voltage $V_{CG}$ within the seventh valley margin is insufficient to open the cell to the source-drain electric current. Hence, the memory controller 115 can determine that the cell's logic state is 110 (corresponding to charge state $Q_7$). Conversely, during a read operation it can be determined that the applied control gate voltage $V_{CG}$ within the seventh valley margin $VM_7$ is sufficient to open the cell to the source-drain electric current. Hence, the memory controller 115 can determine that the cell's XP bit stores value 0. If it is further determined that control gate voltages $V_{CG}$ within the first six valley margins are insufficient to open the cell to the electric current, the memory controller 115 can ascertain the logic state of the cell as 010 (corresponding to the charge state $Q_7$). FIGS. 2A-2C refer to floating gate (FG) NAND memory cells for illustrative purposes only. The memory device may include replacement gate (RG) NAND memory cells instead of FG NAND memory cells, which operate on the same principles as the FG NAND memory cells described above.

Figure 3:
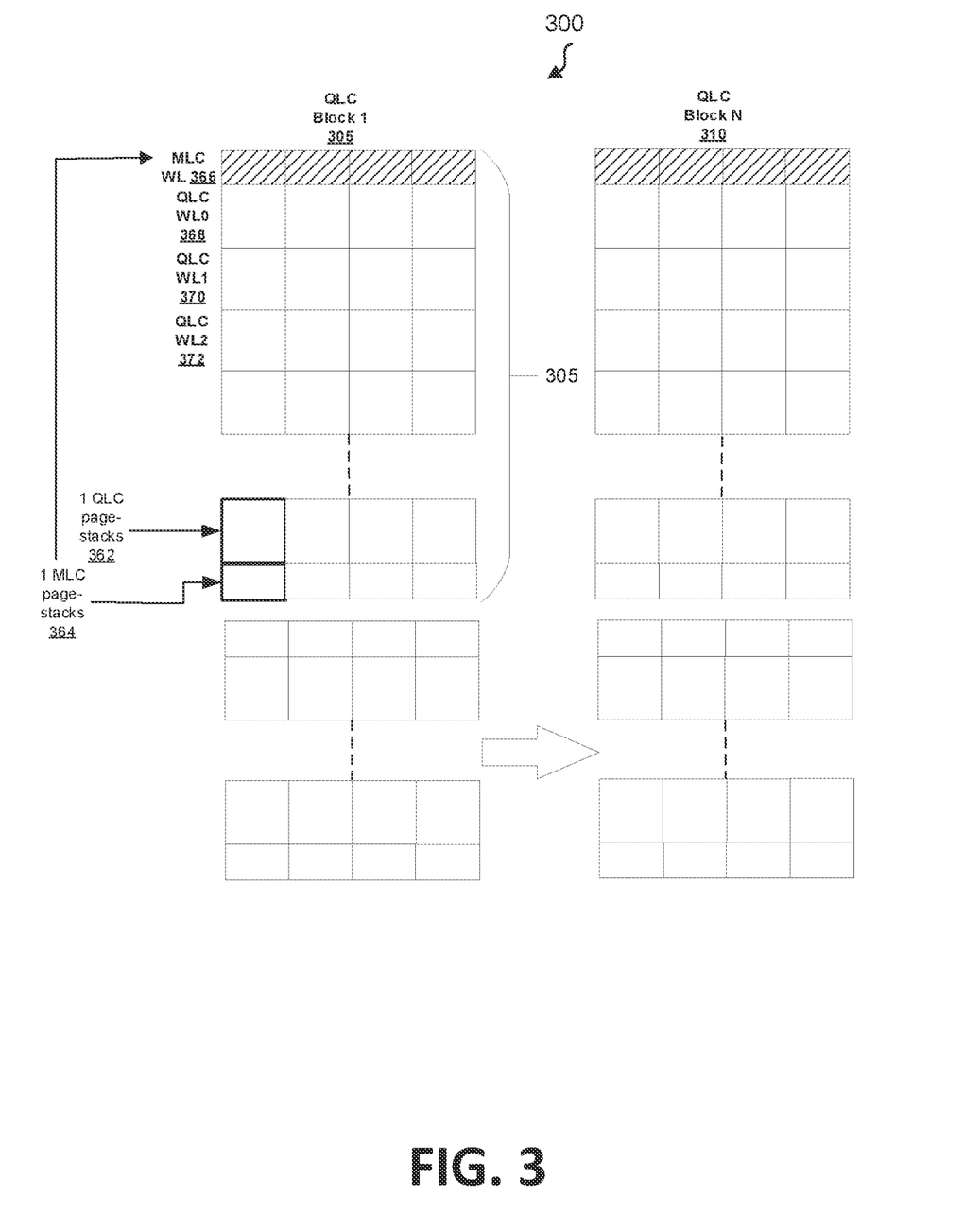
FIG. 3 illustrates an example memory device in which a read operation is performed to reduce first read raw bit error rate, in accordance with some embodiments of the present disclosure.

FIG. 3 illustrates memory cells in an example memory device 300 in which a media scan operation (e.g., a read refresh operation) is performed to reduce first read raw bit error rate, in accordance with some embodiments of the present disclosure.

Memory device 300 includes a plurality of QLC blocks 305, 310 numbered 1 through N. Each QLC block (e.g. QLC block 305) is an ordered set of memory cells and wordlines (e.g. wordlines 366-372) that are connected to those memory cells. The example memory die illustrated in FIG. 3 includes QLC page stacks 362 and one or more MLC page stacks 364 at the boundaries of the memory die. The QLC page stack 362 may include four pages; a lower page, an upper page, an extra page, and a top page. Each page in a page stack may be associated with one of wordlines 366-372 or other wordlines of the block. In one embodiment, the memory sub-system controller (e.g., controller 115) traverses the blocks 305-310 at a defined scan/read refresh frequency, which may be determined based on a current temperature of the memory die. For every block 305, 310 of the memory die, the memory sub-system controller may identify a page that satisfies a lowest sensing overhead criterion (e.g., one that takes the least amount of time to perform a media scan operation) and performs a read operation with respect to the identified page. For example, the memory sub-system controller identifies that the QLC block 305 has an MLC page stack 364 on each boundary of the QLC bock 305 and a plurality of QLC pages stacks 362 between those MLC page stacks 364. Because performing a read operation on a lower page (LP) of a SLC page stack or a MLC page stack takes much lesser time (e.g., 30 μs) when compared to performing a read operation on a page of a QLC page stack (e.g., 90 μs), the memory sub-system controller identifies an MLC wordline 366 in that page stack, and performs a read operation with respect to the plurality of memory pages addressable by that wordline 366. In some embodiments, the memory sub-system controller may perform the read operation with respect to a lower page (LP) of the MLC page stack 364. In some embodiments, the memory sub-system controller may perform the read operation with respect to a lower page (LP) of a SLC page stack 364. The media sensing operation (e.g., read operation) can be performed without transferring the data out of the memory device, and since there is no data transferred out of the memory device, there is no need for the controller to clock out sensed NAND data through the interface (e.g. an open NAND flash interface (ONFI) bus) that connects the memory dies to the host. The read operation performed on a wordline of a block refreshes the entire block thus maintaining the block in the T-state with low RBER and trigger rate. Upon completing the read operation in QLC block 305, the memory sub-system controller then moves onto the next block (e.g., QLC block 310) and performs a read operation in a similar fashion, and continues to perform the read operation in a block-by-block manner until all the states of the blocks on the memory die have been refreshed. These read refresh operations are repeated as long as the memory device is running.

In some embodiments, the memory sub-system controller determines a current temperature of the memory die on which a block is located. Based on the current temperature of the memory die and the historical data of the memory die's transition from T-state to S-state, the memory sub-system controller may determine how long it would take for the block to transition from T-state to S-state at the current temperature. The historical data for the memory die's transition from T-state to S-state for different temperatures may be stored, for example, in the form of metadata in the local memory of the memory sub-system controller (e.g., local memory 119). The memory sub-system controller then sets the scan frequency based on the time it would take for the block to transition from T-state to S-state at the current temperature (e.g., T−1 milliseconds where T is the time it would take for the block to transition from T-state to S-state at the current temperature). By doing so, the memory sub-system controller can ensure that the state of the block is refreshed by performing a read operation and prevent the block from entering S-state. This way, the memory sub-system controller need not clock out data on the block, and the read operation can be timed in a periodic manner where the memory sub-system controller is performing a read operation of the wordlines periodically (e.g., every T−1 milliseconds). Similar to the scan frequency, the memory sub-system controller may also set a temperature sampling rate such that the sensor on the memory die is sensing a current temperature of the memory die periodically. In one illustrative example, the read refresh period may be set to T−2 milliseconds such that if the measured temperature is different from the previously measured temperature, then the memory sub-system controller can update the scan frequency to ensure that the state of the block is refreshed by performing a read operation at the updated scan frequency and prevent the block from entering S-state.

Figure 4:
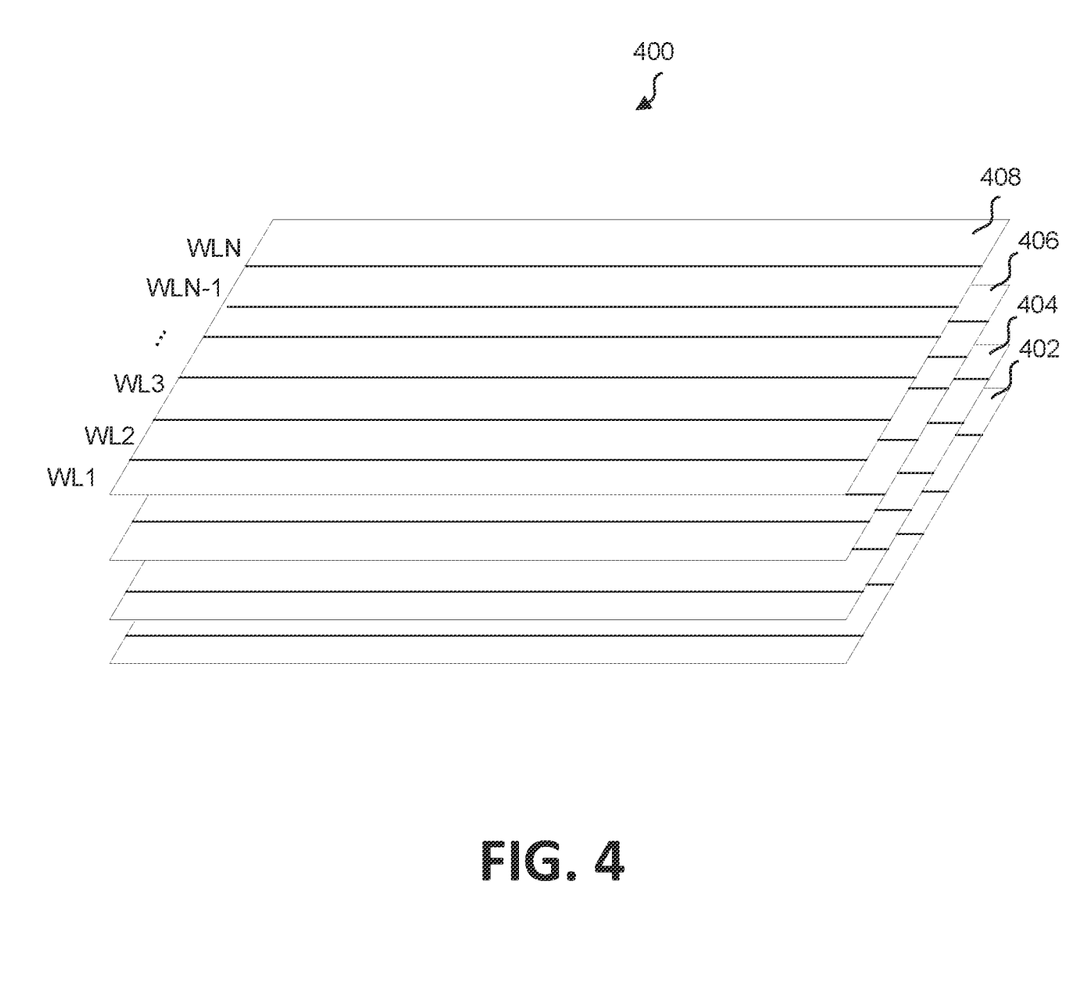
FIG. 4 illustrates an example page stack in a memory device on which a multi-plane read operation is performed in accordance with some embodiments of the present disclosure.

FIG. 4 illustrates an example QLC block 400 including four page collections; a lower page collection 402, an upper page collection 404, an extra page collection 406, and a top page collection 408. The memory cells in block 400 are associated with wordlines WL1, WL2, WL3, . . . WLN−1, WLN. In other words, each of the wordlines WL1, WL2, WL3, . . . WLN−1, WLN in block 400 is associated a plurality of cells, which are not illustrated in this figure for simplicity. In some embodiments, the memory sub-system controller may perform the read operation on a plurality of planes of the memory die (e.g., the read operation may be performed on more than one block on different planes of the memory die, simultaneously). The level of plane parallelism of performing the read operations may be modified as desired to result in an optimized configuration that minimizes trigger rate and reliability risks of the memory sub-system.

Figure 5A:
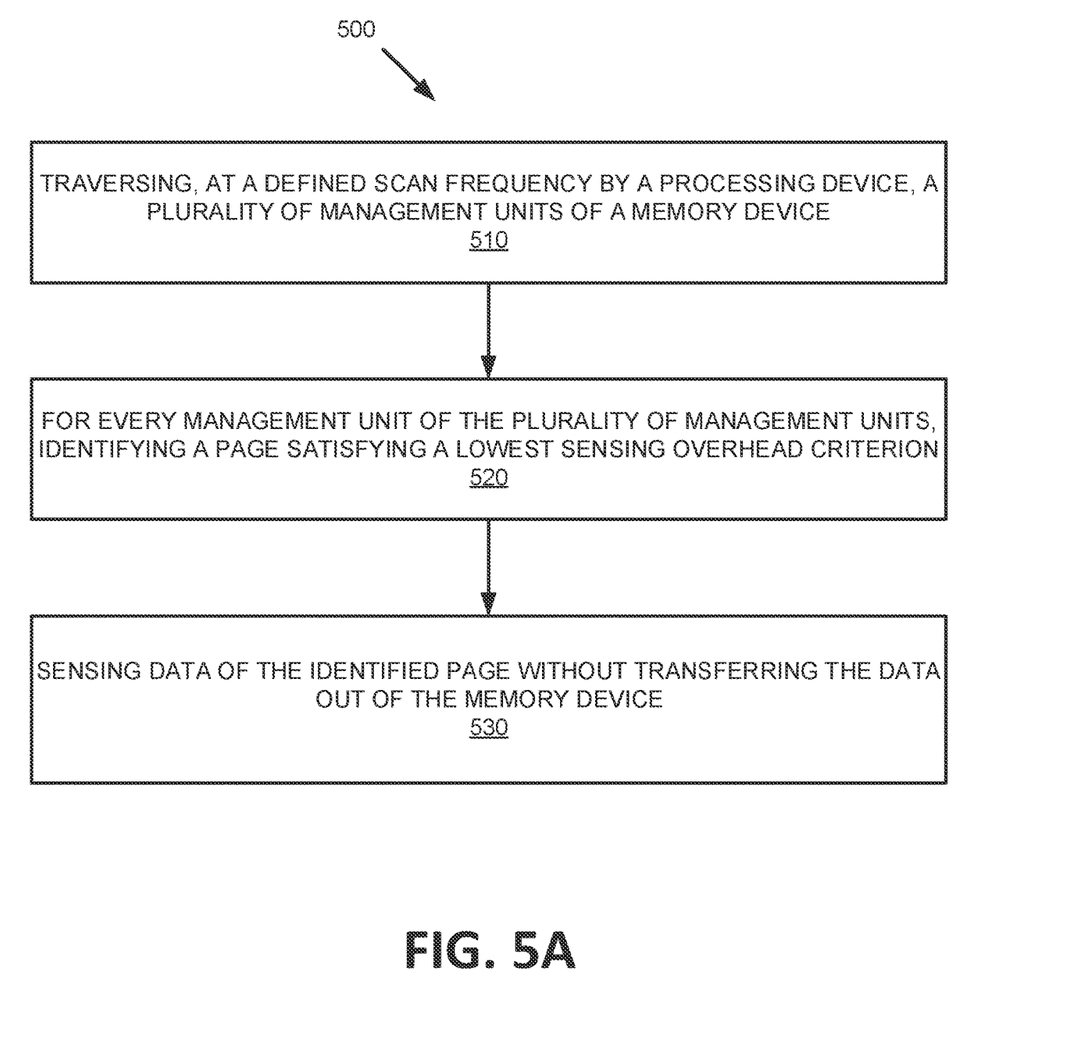
FIG. 5A illustrates a flow diagram of an example method for performing a read operation in a memory device in a memory sub-system, in accordance with some embodiments of the present disclosure.
Figure 5B:
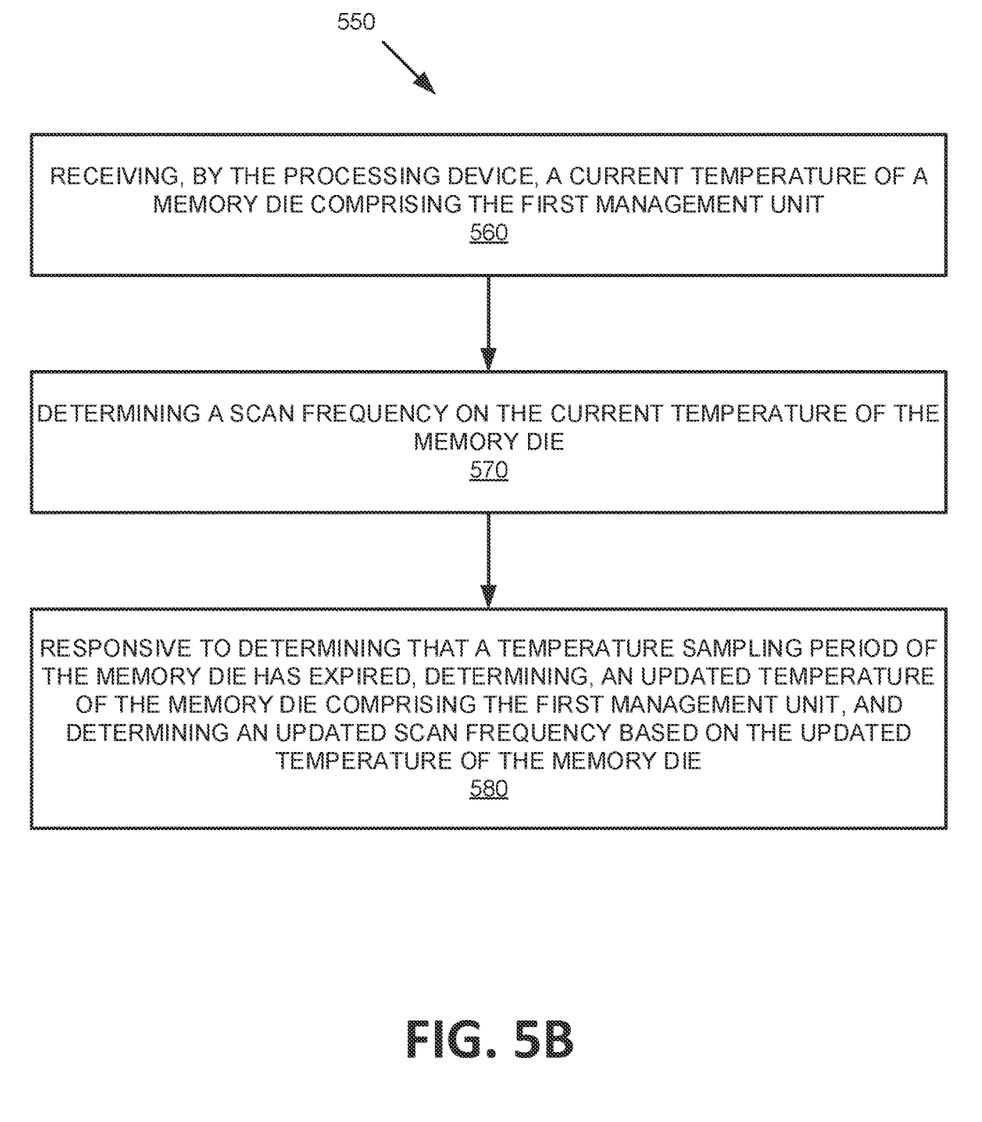
FIG. 5B illustrates a flow diagram of an example method for sensing a memory die temperature and modifying a scan frequency of a memory device in a memory sub-system, in accordance with some embodiments of the present disclosure.

FIGS. 5A & 5B illustrate a flow diagram of an example method 500 for performing a media scan (e.g., read refresh)

operation in a memory device in a memory sub-system in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by memory access management 113, writeback component 137, and local media controller 135 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 5A illustrates a flow diagram of an example method 500 for performing in which a media scan operation (e.g., a read refresh operation) is performed to reduce first read raw bit error rate, in accordance with some embodiments of the present disclosure. At step 510, the processing device (e.g., processor 117) traverses the blocks at a defined scan/read refresh frequency, which may be determined based on a current temperature of the memory die. For every block of the memory die, the processing device may identify a page that satisfies a lowest sensing overhead criterion (e.g., one that takes the least amount of time to perform a media scan/read refresh operation, such as a lower page (LP) of a SLC page stack or a lower page (LP) of a MLC page stack), at operation 520. At operation 530, the processing device may perform a media sensing operation (e.g., a read operation) with respect to the identified page. For example, the processing device identifies that a block has a lower level cell (e.g., SLC or MLC) and at step 520 identifies that the block has an upper level cell (e.g., TLC or QLC). Because performing a read operation on a lower page (LP) of a SLC page stack or a MLC page stack takes much lesser time (e.g., 30 μs) when compared to performing a read operation on a page of a QLC page stack (e.g., 90 μs), at step 530, the processing device identifies an MLC wordline in that page stack and performs a read operation with respect to the plurality of memory pages addressable by that wordline. In some embodiments, the processing device may perform the read operation with respect to a lower page (LP) of an MLC page stack. In some embodiments, the processing device may perform the read operation with respect to a lower page (LP) of the MLC page stack. The media sensing operation (e.g. read operation) may be performed without transferring the data out of the memory device. Since there is no data transferred out of the memory device, there is no need for the processing device to clock out sensed NAND data through the interface (e.g. an open NAND flash interface (ONFI) bus) that connects the memory dies to the host. The read operation performed on a wordline of a block refreshes the entire block thus maintaining the block in the T-state with low RBER and trigger rate. Upon completing the read operation in a block, the processing device then moves onto the next block and performs a read operation in a similar fashion, and continues to perform the read operation in a block-by-block manner until all the states of the blocks on the memory die have been refreshed.

FIG. 5B illustrates a flow diagram of an example method 550 in which a media scan operation (e.g., a read refresh operation) is performed to reduce first read raw bit error rate, in accordance with some embodiments of the present disclosure. At step 560, the processing device determines a current temperature of the memory die on which a block is located. Based on the current temperature of the memory die and the historical data of the memory die's transition from T-state to S-state, the processing device may be able to determine how long it would take for the block to transition from T-state to S-state at the current temperature. The historical data for the memory die's transition from T-state to S-state for different temperatures may be stored, for example, in the form of metadata in the local memory of the memory sub-system controller. At step 570, the processing device then sets the scan/read refresh frequency based on the time it would take for the block to transition from T-state to S-state at the current temperature (e.g., T–1 milliseconds where T is the time it would take for the block to transition from T-state to S-state at the current temperature). By doing so, the processing device can ensure that the state of the block is refreshed by performing a read operation and prevent the block from entering S-state. This way, the processing device need not clock out data on the block, and the read operation can be timed in a periodic manner where the processing device is performing a read operation of the wordlines periodically (e.g., every T–1 milliseconds). At step 580, similar to the scan/read refresh frequency, the processing device may also set a temperature sampling rate such that the sensor on the memory die is sensing a current temperature of the memory die periodically. In one illustrative example, the read refresh rate may be set to T–2 milliseconds such that if the measured temperature is different from the previously measured temperature, then the processing device can update the scan/read refresh frequency to ensure that the state of the block is refreshed by performing a read operation at the updated scan/read refresh frequency and prevent the block from entering S-state. In some embodiments, the memory sub-system controller may perform the read operation on a plurality of planes of the memory die (e.g., the read operation may be performed on more than one block on different planes of the memory die, simultaneously).

Figure 6:
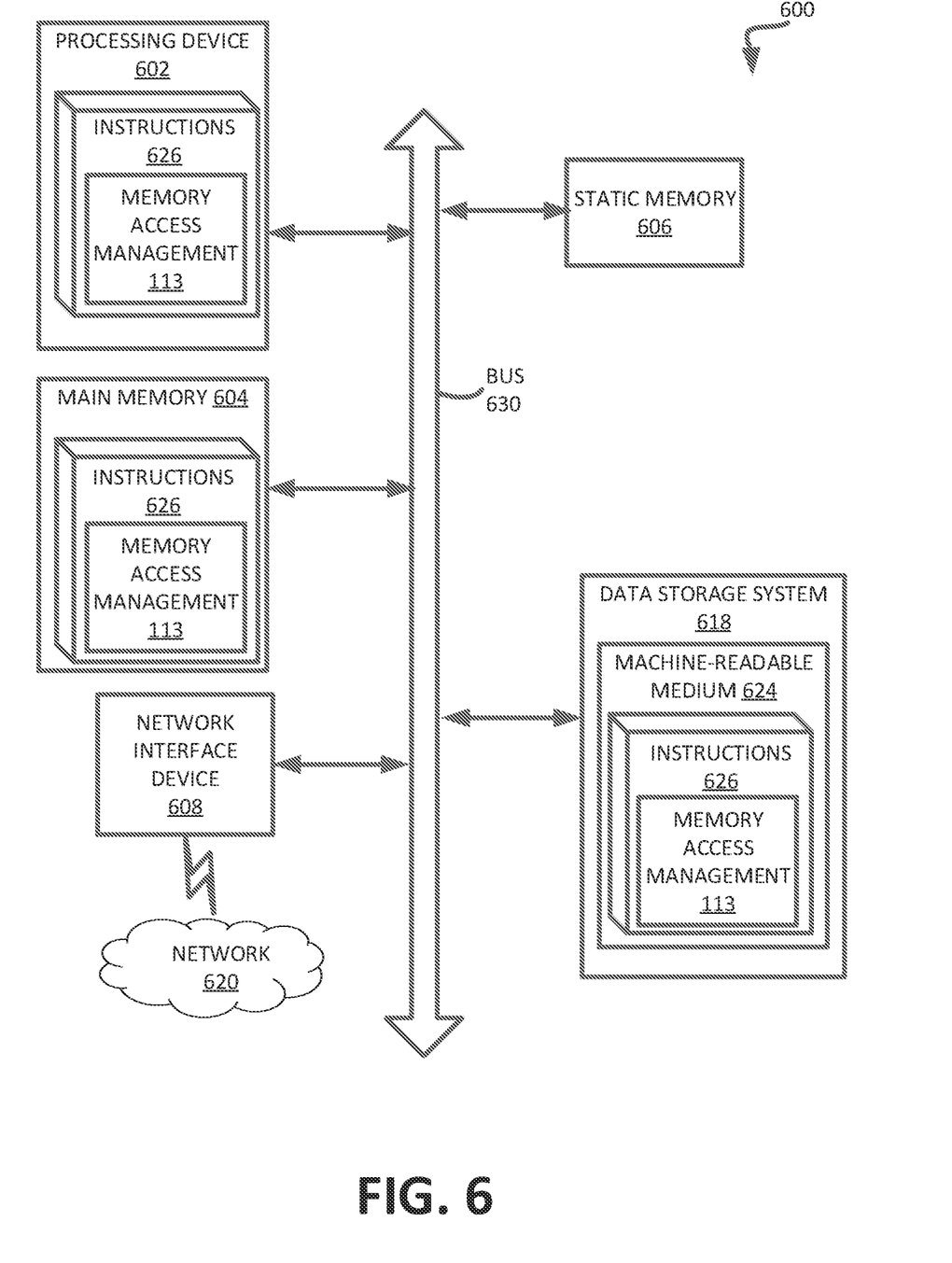
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to memory access management 113, memory sub-system controller 115, or local media controller 135 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to memory access management 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   traversing, at a defined scan frequency by a processing device, a plurality of management units of a memory device;
   for every management unit of the plurality of management units, identifying a page satisfying a lowest sensing overhead criterion, wherein the lowest sensing overhead criterion minimizes a duration of a media scan operation of the memory device; and
   sensing data of the identified page without transferring the data out of the memory device.

2. The method of claim 1, wherein each management unit of the plurality of management units is represented by one of: a block or a superblock of the memory device.

3. The method of claim 1, wherein the page satisfying the lowest sensing overhead criterion comprises a single-level cell (SLC) page or a multi-level cell (MLC) page.

4. The method of claim 1, wherein the lowest sensing overhead criterion specifies a minimum amount of time to perform a media scan operation.

5. The method of claim 1, further comprising:
   updating the defined scan frequency based on a current operating temperature of the memory device.

6. The method of claim 1, wherein sensing data of the identified page comprises sensing a plurality of planes of the management unit.

7. The method of claim 5, further comprising:
   responsive to determining that a temperature sampling period has expired, determining a current temperature of the memory device; and
   updating the scan frequency based on the current temperature of the memory device.

8. A system comprising:
   a memory device; and
   a processing device, operatively coupled with the memory device, to perform operations comprising:
   traversing, at a defined scan frequency, a plurality of management units of a memory device;
   for every management unit of the plurality of management units, identifying a page satisfying a lowest sensing overhead criterion, wherein the lowest sensing overhead criterion minimizes a duration of a media scan operation of the memory device; and
   sensing data of the identified page without transferring the data out of the memory device.

9. The system of claim 8, wherein the plurality of management units comprise at least one of: a block or a superblock of the memory device.

10. The system of claim 8, wherein the page satisfying the lowest sensing overhead criterion comprises a page from a single-level cell (SLC) or a page from a multi-level cell (MLC).

11. The system of claim 8, wherein the lowest sensing overhead criterion comprises a least amount of time taken to perform a media scan operation.

12. The system of claim 8, wherein the operations further comprise:
   updating the defined scan frequency based on a current operating temperature of the memory device.

13. The system of claim 8, wherein sensing data of the identified page comprises sensing a plurality of planes of the management unit.

14. The system of claim 8, wherein the operations further comprise:
   responsive to determining that a temperature sampling period has expired, determining, an updated temperature of the memory device, and determining an updated scan frequency based on the updated temperature of the memory device.

15. A non-transitory computer-readable storage medium comprising instructions that, when executed by a processing device, cause the processing device to perform operations comprising:
   traversing, at a defined scan frequency, a plurality of management units of a memory device;
   for every management unit of the plurality of management units, identifying a page satisfying a lowest sensing overhead criterion, wherein the lowest sensing overhead criterion minimizes a duration of a media scan operation of the memory device; and
   sensing data of the identified page without transferring the data out of the memory device.

16. The non-transitory computer-readable storage medium of claim 15, wherein the plurality of management units comprise at least one of: a block or a superblock of the memory device.

17. The non-transitory computer-readable storage medium of claim 15, wherein the page satisfying the lowest sensing overhead criterion comprises a page from a single-level cell (SLC) or a page from a multi-level cell (MLC).

18. The non-transitory computer-readable storage medium of claim 15, wherein the lowest sensing overhead criterion comprises a least amount of time taken to perform a media scan operation.

19. The non-transitory computer-readable storage medium of claim 15, wherein the operations further comprise: updating the defined scan frequency based on a current operating temperature of the memory device.

20. The non-transitory computer-readable storage medium of claim 15, wherein the operations further comprise:
   responsive to determining that a temperature sampling period has expired, determining, an updated temperature of the memory device, and determining an updated scan frequency based on the updated temperature of the memory device.

* * * * *